3,556,703
SMALL LIGHTER

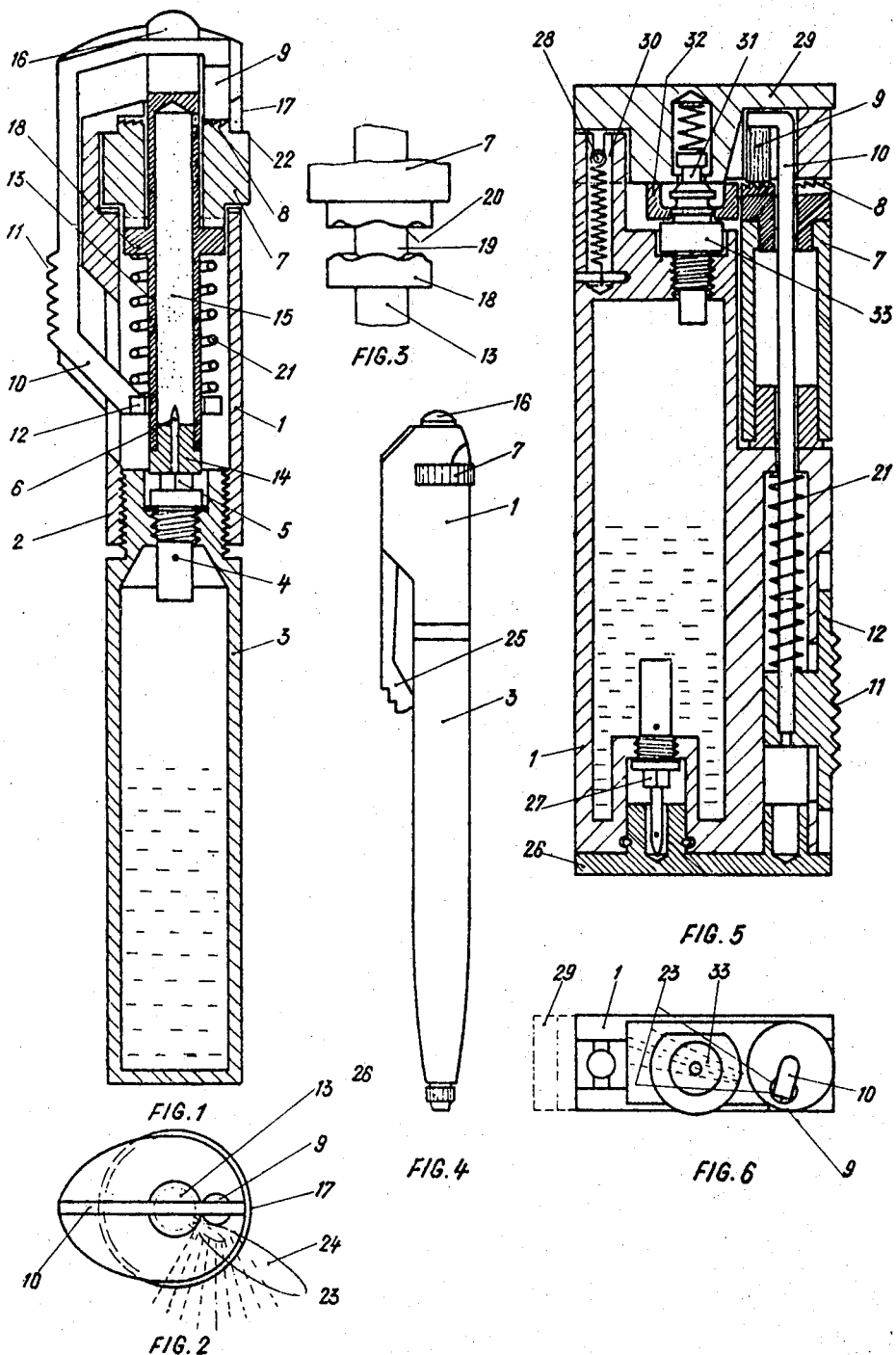

Peter Florjancic, Garmisch-Partenkirchen, Germany, assignor to S.A.F.F.A. S.p.A. Fabbriche Fiammiferi Ed Affini, Milan, Italy, a corporation of Italy
Filed Nov. 5, 1968, Ser. No. 773,545
Claims priority, application Austria, Nov. 9, 1967, 10,070/67
Int. Cl. F23q 1/02
U.S. Cl. 431—273      4 Claims

ABSTRACT OF THE DISCLOSURE

A gas-lighter having a spring biased flint which is axially urged against a friction roll.

---

This invention relates to small lighters and particularly to a gas-lighter provided with an ignition device comprised of a friction roll and a flint which is urged thereagainst by a spring-loaded pressure member.

In known lighters of the above kind of friction roll is a cylindrical body provided on the lateral surface thereof with friction teeth and against which the flint is radially urged. The axis of rotation of the friction roll can be horizontal or vertical. In both cases the lighter will result very large in size, many components are required and the insertion of a new flint is often difficult.

The invention makes it possible to provide very small lighters. This is accomplished by axially urging the flint against the friction roll.

The friction teeth are therefore not provided on the lateral surface of the roll, but on a frontal surface. Furthermore it is suggested to arrange the pressure spring which is formed as a coil spring, coaxially with the axis of rotation of the friction roll, so as to have preferably, when seen from the top to the bottom, first the flint, then the roll and finally the spring. In this manner on the one hand the thickness and the width of the lighter can be minimized, since the spring and the roll are arranged the one above the other and on the other hand it is possible by this arrangement to cause the pressure spring to bear not on the housing but on the friction roll so that a force loop is provided leading from the spring, the friction roll, the flint, the pressure member and back to the spring. The support of the friction roll in the housing is therefore relieved from the spring force and therefore can be carried out in a simple and slight manner. Also the friction roll need no longer be supported on an own axis secured to the housing, but can receive in a center bore thereof a functional component of the lighter. This can be for example the pressure member for the flint or the connection passage between the fuel reservoir and the combustion nozzle. In this manner a further place saving is obtained.

According to another embodiment of the invention it is proposed to form the above connection passage as a pre-chamber which is filled preferably with a porous material, such as for example wadding, and which communicates through a valve with the fuel reservoir. If the valve is open, which can occur by direct operation or automatically by rotating the friction roll, the pre-chamber is filled with a predetermined amount of gas which then escapes through the combustion nozzle. After closing the valve the gas stored in the pre-chamber burns out and then the flame extinguishes by itself. By using the arrangement of friction roll, flint and store reservoir according to this invention the volume of the lighter is, by this device which causes a delayed extinguishing of the flame, increased to a very small extent. This delay device according to the invention can therefore be preferably used in a lighter provided with the above mentioned arrangement of the ignition device.

The slight space required by the ignition device resulting from the arrangement according to the invention makes it possible to provide the entire lighter, for example as to its shape and size, in the form of a pencil, it being even possible to embody in it a writing device.

Several embodiments of the invention will be described now in connection with the accompanying drawings. It should be understood, however, that the invention is not limited to these embodiments, which are given for a purpose of illustration only.

FIGS. 1 and 2 show a first embodiment in a sectional and plan view respectively;

FIG. 3 shows a detail of FIG. 1 to an enlarged scale;

FIG. 4 is an elevational view of a lighter made in the form of a pencil;

FIGS. 5 and 6 show a third embodiment in a sectional and plan view, respectively.

Similar parts are given in the several figures the same reference numerals.

The lighter according to the embodiment shown in FIGS. 1 and 2 comprises a cylindrical housing 1 having at its lower end an inner thread 2 in which the fuel reservoir 3 is screwed. This fuel reservoir is provided with a single valve 4 adapted simultaneously for both the filling and the discharge. This valve is substantially made up of a check-valve which can be opened by depressing the extension element 5, so that an escape of gas can occur from the fuel reservoir 3, through the valve 4, and the tip-ended tube 6.

Supported in the housing 1 is the roll 7. The roll is provided at the upper frontal side with friction teeth 8 against which the flint 9 is urged. The pressure application occurs by means of a pressure member in the form of a stirrup 10 extending laterally downwards and provided at 11 with a knurling extending from the housing. The pressure member 10 extends at its lower end in a ring 12 surrounding a cylindrical pre-chamber 13.

This pre-chamber 13 is closed at its lower end by a plastic plug 14 through the bore of which the tube 6 of the valve 4 extends up to the interior of the pre-chamber, the inside of the pre-chamber being filled with a wadding 15 for example. The pre-chamber 13 extends through a center bore in the roll 7 and through the housing 1 up to the outside. The end is in the form of a push-button 16. The pre-chamber 13 is provided furthermore in the area of the friction teeth 8 with a radial bore 17 forming the burning nozzle.

The pre-chamber 13 is provided with a collar 18 bearing with its upper surface against the lower frontal surface of the friction roll 7. The two above-mentioned surfaces are provided with corrugations 19 and 20 respectively.

A coil spring 21 bears on the one hand against the ring of the pressure member 10, and on the other hand against the collar 18 of the pre-chamber 13.

The housing 1 is provided with a slot 22 for the insertion of the flint 9.

The operation of this embodiment is as follows: under normal condition the valve 4 is closed. If the friction roll 7 is rotated, the corrugations 19 and 20 cause a periodical axial movement of the pre-chamber 13 which urges with the lower end thereof agains the extension element 5, so that the valve 4 releases the passage of gas from the fuel reservoir 3 to the pre-chambber 13. An amount of gas escapes soon through the bore 17 and is ignited by the sparks 23. The gas in pre-chamber 13 is burnt now in a certain time depending upon the amount of gas overflowed and the porosity of the wadding 15. The gas amount can be controlled by screwing more or less the fuel reservoir 3 in the housing 1. If it is desired a longer burnlife of the flame 24, then the valve 4 can be held open by means of the pressure applied on the button 16 a longer time.

The lighter according to this embodiment exhibits therefore a number of technical advantages and features as to its usage, and nevertheless is smaller than the lighters-heretofore known.

In FIG. 4 an embodiment is shown wherein the lighter is in the form of a pencil and can be secured by means of a clip 25 and the mike to the breast pocket of a sack coat. This embodiment is provided at its lower end with a refill holder 26.

The embodiment shown in FIGS. 5 and 6 is rectangular in cross section. As in known lighters there are provided a filling nozzle 27 covered by a threaded plug 26, and a cover 29 rotatable supported about the axis 28, which cover operates by means of a spring 30 the opening pin 31 of a normal burn nozzle 33 provided with an adjusting ring 32.

The pressure member 10 is comprised of a rod located in the center bore of the friction roll 7, and which bears at its bent upper end against the flint 9 and at the other end is screwed in the sliding member 12.

I claim:

1. Small lighter, particularly gas-lighter, having a casing provided with an ignition device comprised of a friction roll and a flint which is urged thereagainst by a spring-loaded pressure member, characterized in that the flint is axially urged against the friction roll, said spring, which is formed as a coil spring, being arranged coaxially with the axis of rotation of said friction roll, and said spring and said flint being arranged on opposite sides of said friction roll.

2. A lighter as claimed in claim 1 wherein said friction roll is formed with an axial bore and said flint is pressed against said friction roll by the bent end of a rod passing through said bore, said spring being a coil spring arranged coaxially with said rod.

3. A lighter as claimed in claim 2 wherein said rod has a portion extending outside the lighter casing for the actuation of said rod for flint recharge purposes.

4. Lighter as claimed in claim 1, characterized in that said spring bears at one end on said pressure member and at the other end on said friction roll.

References Cited

FOREIGN PATENTS

| 389,584 | 9/1908 | France | 431—277 |
| 1,055,359 | 1/1967 | Great Britain | 431—273 |

EDWARD G. FAVORS, Primary Examiner

U.S. Cl. X.R.

431—254